United States Patent
Labrousse et al.

(10) Patent No.: US 7,884,047 B2
(45) Date of Patent: Feb. 8, 2011

(54) SUBSTRATE, IN PARTICULAR GLASS SUBSTRATE, SUPPORTING A PHOTOCATALYTIC LAYER COATED WITH A PROTECTIVE THIN LAYER

(75) Inventors: Laurent Labrousse, Saint Prim (FR); Nicolas Nadaud, Gentilly (FR)

(73) Assignee: Saint-Gobain Glass France, Courbevoie (FR)

(*) Notice: Subject to any disclaimer, the term of this patent is extended or adjusted under 35 U.S.C. 154(b) by 1092 days.

(21) Appl. No.: 10/577,049

(22) PCT Filed: Oct. 22, 2004

(86) PCT No.: PCT/FR2004/050531
§ 371 (c)(1), (2), (4) Date: Dec. 12, 2006

(87) PCT Pub. No.: WO2005/040056
PCT Pub. Date: May 6, 2005

(65) Prior Publication Data
US 2007/0148064 A1    Jun. 28, 2007

(30) Foreign Application Priority Data
Oct. 23, 2003 (FR) .................. 03 50730

(51) Int. Cl.
B32B 19/00 (2006.01)
B32B 5/16 (2006.01)
B32B 9/00 (2006.01)
B32B 15/02 (2006.01)
B32B 17/02 (2006.01)
B32B 21/02 (2006.01)
B32B 23/02 (2006.01)
B32B 27/02 (2006.01)
B01J 23/00 (2006.01)

(52) U.S. Cl. .................. 502/350; 428/357; 428/403; 428/404; 428/688; 428/689; 428/697; 428/698

(58) Field of Classification Search .................. 502/350; 428/357, 403, 404, 688, 689, 697, 698
See application file for complete search history.

(56) References Cited

U.S. PATENT DOCUMENTS

| 6,045,896 | A  | * | 4/2000  | Boire et al. ........... 428/216 |
| 6,379,776 | B1 |   | 4/2002  | Tada et al. |
| 6,436,542 | B1 | * | 8/2002  | Ogino et al. .......... 428/432 |
| 6,576,344 | B1 | * | 6/2003  | Doushita et al. ....... 428/426 |
| 6,875,319 | B2 |   | 4/2005  | Nadaud et al. |
| 7,005,188 | B2 |   | 2/2006  | Anderson et al. |
| 7,737,080 | B2 | * | 6/2010  | Labrousse et al. ..... 502/350 |
| 2004/0241406 | A1 |  | 12/2004 | Nadaud et al. |
| 2005/0123772 | A1 |  | 6/2005  | Coustet et al. |
| 2007/0082205 | A1 | * | 4/2007  | Anzaki et al. ......... 428/432 |

FOREIGN PATENT DOCUMENTS
EP    1 074 525     2/2001
JP    2000-289134  * 10/2000

OTHER PUBLICATIONS

Written Opinion for PCT/FR2004/050531.*
U.S. Appl. No. 10/576,724, filed Apr. 21, 2006, Labrousse, et al.
U.S. Appl. No. 10/577,049, filed Apr. 24, 2006, Labrousse, et al.
U.S. Appl. No. 10/568,390, filed Feb. 15, 2006, Labrousse, et al.
U.S. Appl. No. 10/565,001, filed Jan. 19, 2006, Labrousse, et al.
U.S. Appl. No. 10/581,056, filed May 30, 2006, Fleury, et al.
U.S. Appl. No. 10/567,901, filed Feb. 10, 2006, Fleury, et al.
U.S. Appl. No. 10/562,222, filed Dec. 23, 2005, Schicht, et al.
U.S. Appl. No. 11/097,831, filed Apr. 4, 2005, Nadaud, et al.
U.S. Appl. No. 10/519,098, filed Jan. 20, 2006, Fleury, et al.

* cited by examiner

Primary Examiner—Patricia L Hailey
(74) Attorney, Agent, or Firm—Oblon, Spivak, McClelland, Maier & Neustadt, L.L.P.

(57) ABSTRACT

The invention relates to a structure, comprising a substrate supporting a layer with a photocatalytic and anti-soiling property, said layer being based on titanium dioxide ($TiO_2$), on at least part of the surface thereof. Said structure is characterized in that the photocatalytic layer is coated with a non-porous thin layer, containing silicon and oxygen and having a coating capacity, providing a chemical and mechanical protection to the underlying photocatalytic layer, while maintaining the $TiO_2$ photocatalytic activity.

29 Claims, No Drawings

SUBSTRATE, IN PARTICULAR GLASS SUBSTRATE, SUPPORTING A PHOTOCATALYTIC LAYER COATED WITH A PROTECTIVE THIN LAYER

The present invention relates to substrates, such as glass, glass-ceramic or plastic substrates, which have been provided with a photocatalytic coating in order to give them what is called an "antisoiling or self-cleaning" function.

One important application of these substrates relates to glazing, which may be applied in very many different situations—from utilitarian glazing to glazing used in domestic electrical appliances, from automotive glazing to architectural glazing.

It also applies to reflective glazing of the mirror type (domestic mirrors or driving mirrors) and to opacified glazing of the lightened type.

Similarly, the invention also applies to nontransparent substrates, such as ceramic substrates or any other substrate that may in particular be used as architectural material (metal, tiling, etc.). Preferably, it applies, irrespective of the nature of the substrate, to substantially flat or slightly curved substrates.

Photocatalytic coatings have already been studied, especially those based on titanium oxide crystallized in anatase form. Their capability of degrading any soiling of organic origin or microorganisms through the action of UV radiation is very beneficial. They also often have a hydrophilic character, allowing mineral soiling to be removed by spraying it with water or, in the case of exterior glazing, by rain.

This type of coating exhibiting antisoiling, bactericidal or algicidal properties has already been described, for example in patent WO 97/10186, which describes several embodiments thereof.

If it is not protected, the photocatalytic layer is worn away over the course of time, this being manifested by a loss of its activity, loss of optical quality of the structure (appearance of haze or coloration), or even delamination of the layer.

If the thickness of the photocatalytic layer decreases, the coloration liable to appear when this layer is partially impaired will be less intense and the color change will be less over the course of time. However, this reduction in thickness will be to the detriment of the performance of the layer.

It is therefore necessary to provide the layer with mechanical and chemical protection, the thickness of the protective layer having to be small so that the photocatalytic layer fully retains its function.

European patent application EP-A-0 820 967 discloses an antifogging element comprising a transparent substrate, a transparent film of a photocatalyst formed on the transparent substrate, and a transparent porous mineral oxide film formed on the photocatalyst film and having a surface exhibiting a hydrophilic property.

Japanese patent JP 2002 047 032 also discloses a process for manufacturing a substrate coated with a photocatalytic membrane, which comprises the steps consisting in spraying nanoparticles of $TiO_2$ of anatase crystalline structure with a size of 5-10 nm using a spray gun, in heating and in depositing, by sputtering, an $SiO_2$ membrane covering the $TiO_2$ particles.

None of these structures is satisfactory, the first because of the porous nature of the protective coating, which, because of the presence of pores, provides insufficient protection of the catalytic layer, and the second because of an insufficient amount of photocatalytic material, which does not form a continuous layer.

The present invention provides a solution to this problem.

The first subject of the present invention is a structure comprising a substrate bearing, on at least part of its surface, a photocatalytic antisoiling layer based on titanium dioxide ($TiO_2$), characterized in that said photocatalytic layer is coated with a thin nonporous layer, containing silicon and oxygen and having a covering power, capable of mechanically and chemically protecting the underlying photocatalytic layer, while maintaining the photocatalytic activity of the $TiO_2$.

The conditions for forming the titanium-dioxide-based layer—such as the nature and purity of the starting products, optional solvent, heat treatment—have to be adapted in a known manner for the purpose of obtaining the photocatalytic antisoiling property.

Preferably, said thin layer containing silicon and oxygen is present in the form of a continuous film. In particular, said thin layer is advantageously in the form of a film that conforms to the surface asperities of the underlying photocatalytic layer.

The thin layer containing silicon and oxygen is in particular a layer of at least one silicon-oxygen compound chosen from $SiO_2$, $SiOC$, $SiON$, $SiO_x$, where $x<2$, and $SiOCH$, $SiO_2$ being particularly preferred.

According to an advantageous embodiment of the structure according to the present invention, the thin layer containing silicon and oxygen is a layer of at least one silicon-oxygen compound to which at least a compound chosen from $Al_2O_3$ and $ZrO_2$ is associated, such a compound being chemically inert and enhancing the hydrolytic resistance. The role of $Al_2O_3$, a well-known inert oxide which increases the chemical resistance of the assembly may be emphasized.

The (Al and/or Zr)/Si atomic ratio does not generally exceed 1, the Al/Si ratio being advantageously between 0.03 and 0.5, in particular between 0.05 and 0.1, and the Zr/Si ratio being between 0.05 and 0.4.

The thin layer containing silicon and oxygen may have a thickness of at most 15 nm, especially at most 10 nm and in particular at most 8 nm, being preferably at most 5 nm, or about 5 nm, in particular 2 to 3 nm.

Said thin layer provides a lubricating effect and a mechanical role, by improving the scratch and abrasion resistance.

This greater mechanical resistance and this better chemical resistance are, however, not obtained to the detriment of a reduction in photocatalytic activity. This is because, although it might be expected that the photocatalytic activity of the $TiO_2$-based layer finally obtained would be reduced owing to the masking of the latter by the $SiO_2$ overlayer, this photocatalytic activity is preserved, and even improved—any soiling, being diluted in a uniform film of $SiO_2$, owing to the hydrophilicity of the latter, is more easily destroyed by $TiO_2$.

The titanium dioxide-based layer consists of $TiO_2$ alone or of $TiO_2$ doped with at least one dopant chosen especially from: N; pentavalent cations such as Nb, Ta and V; Fe; and Zr. This $TiO_2$-based layer may have been deposited by a sol-gel method or by a pyrolysis, especially chemical vapor deposition, method or by sputtering, at room temperature, where appropriate magnetron and/or ion-beam sputtering, using a metal or $TiO_x$ target, where $x<2$, and in an oxidizing atmosphere, or using a $TiO_2$ target in an inert atmosphere, the $TiO_2$ produced by the sputtering then having possibly being subjected to a heat treatment so as to be in the crystallized state in a photocatalytically active form.

The thin layer containing silicon and oxygen has in particular been deposited by room-temperature vacuum sputtering, at, where appropriate magnetron and/or ion-beam sputtering, using a target of Al (8 at %)-doped Si in an $Ar/O_2$ atmosphere at a pressure of 0.2 Pa.

The structure according to the present invention may include, immediately below the $TiO_2$-based layer, an underlayer having a crystallographic structure for assisting in the crystallization, by heteroepitaxial growth, in the anatase form of the $TiO_2$-based upper layer, especially an underlayer consisting of $ATiO_3$ where A denotes barium or strontium. The thickness of this underlayer is not critical—for example, it may be between 10 nm and 100 nm.

The substrate consists for example of a sheet, whether plane or having curved faces, of monolithic or laminated glass, glass-ceramic or a hard thermoplastic, such as polycarbonate, or else of glass or glass-ceramic fibers, said sheets or said fibers having, where appropriate, received at least one other functional layer before application of the $TiO_2$-based layer or of a layer for assisting in the crystallization of the latter by heteroepitaxial growth. (In the case of more than one layer, this may also be referred to as a stack or multilayer).

The applications of the sheets were mentioned above. As regards applications of the fibers, mention may be made of air or water filtration, and also bactericidal applications.

The functional layer or the other functional layers are chosen from layers having an optical functionality, thermal control layers and conducting layers, and also, if the substrate is made of glass or glass-ceramic, layers acting as a barrier to the migration of alkali metals from the glass or from the glass-ceramic.

The layers having an optical functionality are especially antireflection layers, light radiation filtration layers, coloration filtration layers, scattering layers, etc. $SiO_2$, $Si_3N_4$, $TiO_2$, $SnO_2$, ZnO layers may be mentioned.

The thermal control layers are especially solar control layers or what are called "low-e" (low-emissivity) layers.

The conducting layers are especially heating layers, antenna layers or antistatic layers—arrays of conducting wires may be included in these layers.

If the substrate is made of glass or glass-ceramic, at least one functional layer acting as a barrier to the migration of alkali metals from the glass or glass-ceramic may be placed beneath the photocatalytic layer or beneath the underlayer for assisting in the crystallization of the latter, if such an underlayer is provided. The other functional layers (having an optical functionality, thermal control or conducting layers) when they are present are on top of the barrier layer or layers.

Alkali metals are liable to migrate as a result of applying temperatures in excess of 600° C. Such layers forming a barrier to alkali metals during subsequent heat treatments are known, and mention may be made of $SiO_2$, SiOC, $SiO_xN_y$ and $Si_3N_4$ layers, having a thickness for example of at least 5 or 10 nm, and in many cases of at least 50 nm, as described in PCT international application WO 02/24971.

As an example, mention may be made of glass or glass-ceramic substrates, especially of the sheet type, that have received a layer forming a barrier to the migration of alkali metals from the glass or glass-ceramic, followed by a monolayer, bilayer or trilayer of optical functionality.

The subject of the present invention is also a process for manufacturing such a structure as defined above, characterized in that an optionally doped $TiO_2$ layer is deposited on a substrate made of glass or glass-ceramic or polycarbonate-type hard plastic, of the sheet type, or on glass or glass-ceramic fibers, said optionally doped $TiO_2$ layer being subjected to a heat treatment in order to give it a photocatalytic property if this is not provided by the conditions used for depositing it, and then a thin layer containing silicon and oxygen as defined above is deposited on said photocatalytic layer.

In particular, the deposition of a $TiO_2$ layer and that of the thin layer containing silicon and oxygen are carried out in succession at room temperature, by vacuum sputtering, where appropriate magnetron and/or ion-beam sputtering, in the same chamber, the conditions being the following:

for depositing the $TiO_2$-based layer, supply in AC or DC mode, at a pressure of 1-3 mbar and in an oxygen/inert gas (argon) atmosphere, using a Ti or $TiO_x$ target, where $x=1.5$ to 2; and for depositing the layer containing silicon and oxygen, supply in AC mode at a pressure of 0.1 to 1.0 Pa and in an $Ar/O_2$ atmosphere using a target having a high silicon content, the deposition of the $TiO_2$ layer being optionally preceded by the deposition of an underlayer for assisting in the crystallization by epitaxial growth in the anatase form of the $TiO_2$ layer.

The conditions for depositing a nonporous layer containing silicon and oxygen are known to those skilled in the art, being especially low-pressure and high-power conditions (Thornton diagram).

In the case in which the coating is applied to a glass or glass-ceramic substrate, provision may be made, before application of the $TiO_2$ layer or of the underlayer associated therewith, for at least one layer forming a barrier to the migration of alkali metals present in the glass or glass-ceramic to be deposited on the substrate, an annealing or toughening operation then possibly being carried out, after the $TiO_2$ layer and the thin silicon-based layer covering the latter have been deposited, at a temperature of between 250° C. and 550° C., preferably between 350° C. and 500° C., in the case of the annealing operation and at a temperature of at least 600° C. in the case of the toughening operation.

It is also possible according to the invention to provide, after the optional application of at least one layer forming a barrier to the migration of alkali metals and before application of the $TiO_2$ layer or the underlayer associated with the latter, for at least one functional layer chosen from layers having an optical functionality, thermal control layers and conducting layers to be deposited, said functional layers being advantageously deposited by vacuum sputtering, where appropriate magnetron and/or ion-beam sputtering.

The present invention also relates to single or multiple glazing, in particular for motor vehicles or buildings, comprising, on at least one face, a structure according to the invention as defined above, said face being especially that facing the outside, or possibly also that facing the inside.

Those faces of this glazing that do not have the structure of the present invention may include at least one other functional layer.

Such glazing is applicable as "self-cleaning" glazing, especially antifogging, anticondensation and antisoiling glazing, especially as architectural glazing of the double-glazing type, automotive glazing of the windshield, rear window and side windows of automobiles, driving mirrors, glazing for trains, airplanes and ships, utilitarian glazing, such as glass for aquariums, shop windows, greenhouses, interior furnishing, urban furniture (bus shelters, advertising panels, etc.), mirrors, screens for display systems of the computing, television or telephone type, electrically controllable glazing, such as electrochromic or liquid-crystal glazing, electroluminescent glazing and photovoltaic glazing.

The following examples illustrate the present invention without however limiting the scope thereof.

EXAMPLES 1a AND 1b

According to the Invention

Glass/Al:SiO$_2$/TiO$_2$/Al:SiO$_2$ Stack

The following successive layers were deposited on a sheet of glass 4 mm in thickness:
- an Al-doped SiO$_2$ underlayer 150 nm in thickness;
- a TiO$_2$ layer 100 nm in thickness (Example 1a) or 20 nm in thickness (Example 1b); and
- an Al-doped SiO$_2$ overlayer 2 nm in thickness.

The Al:SiO$_2$ underlayer was deposited using an Al:Si target (containing 8 at % aluminum) with a power of 2000 W, with the following gas flow rates: 15 sccm Ar and 15 sccm O$_2$, and at a pressure of $2\times10^{-3}$ mbar.

The TiO$_2$ layer was deposited using a TiO$_x$ target with a power of 2000 W, with the following gas flowrates: 200 sccm Ar and 2 sccm O$_2$ and at a pressure of $23\times10^{-3}$ mbar.

The Al:SiO$_2$ overlayer was deposited using an Al:Si target (containing 8 at % Al) with a power of 1000 W, with the following gas flowrates: 15 sccm Ar and 15 sccm O$_2$ and at a pressure of $2\times10^{-3}$ mbar.

EXAMPLES 2 AND 2b

Comparative Examples

Glass/Al:SiO$_2$/TiO$_2$ Stack

The same stacks as in Examples 1a and 1b were manufactured except that the Al:SiO$_2$ overlayer was omitted.

EXAMPLE 3

Comparative Example

Glass/Al:SiO$_2$/TiO$_2$/Al:Si$_3$N$_4$ Stack

The same stack as in Example 1a was manufactured, except that instead of the Al:SiO$_2$ overlayer, an Al:Si$_3$N$_4$ overlayer was deposited, again with a thickness of 2 nm, using an Al:Si target (containing 8 at % Al) with a power of 1000 W, with the following gas flow rates: 18 sccm Ar and 12 sccm N$_2$ and at a pressure of $2\times10^{-3}$ mbar.

EXAMPLE 4

Resistance to the Opel Test

Considerable improvement in the resistance to the Opel test (dry rubbing of the surface of the stack using a felt pad) was observed when going from the stack of Example 2a to the stack of Example 1a.

No change was observed ongoing from the stack of Example 2a to the stack of Example 3.

Moreover, before and after the above Opel test, the photocatalytic activity of the TiO$_2$ layer was evaluated for each of the stacks of Examples 1a, 2a and 3 according to the stearic acid photodegradation test (SAT) followed by infrared transmission, described in PCT international application WO 00/75087.

The results are given in Table I. Also shown in this table are the calorimetric change in reflection on the layer side due to the Opel test ($\Delta E$), the haze induced by the Opel test and the observation regarding the delamination of the layer after the Opel test.

TABLE I

| | SAT (cm$^{-1}$·min$^{-1}$) | | | | |
|---|---|---|---|---|---|
| Example | Before Opel test | After Opel test | $\Delta E$ | Haze (%) | Delamination |
| 1a (invention) | $59\times10^{-3}$ | $41\times10^{-3}$ | 2.0 | 0.5 | no |
| 2a (comparative) | $54\times10^{-3}$ | $25\times10^{-3}$ | 9.3 | 9.3 | yes |
| 3 (comparative) | $40\times10^{-3}$ | $15\times10^{-3}$ | 10.0 | 12 | yes |

EXAMPLE 5

Taber Test

An improvement in the resistance to the Taber test (abrasion resistance=resistance to the passage of an abrasive wheel) was observed on going from the stack of Example 2b to the stack of Example 1b.

The layer of Example 2b delaminated after 500 revolutions in the Taber test. For the stack of Example 1b, a 0.8% haze was observed after 200 revolutions in the Taber test and 2% haze after 500 revolutions in the Taber test.

EXAMPLE 6

NSF Test

An improvement in the resistance to the NSF (neutral salt fog) test was observed on going from the stack of Example 2a to the stack of Example 1a.

The invention claimed is:

1. A structure comprising a substrate bearing, on at least part of its surface, a photocatalytic antisoiling layer comprising titanium dioxide (TiO$_2$), wherein said photocatalytic antisoiling layer is coated with a thin nonporous layer comprising silicon and oxygen and having a covering power, wherein said thin nonporous layer mechanically and chemically protects the underlying photocatalytic layer, while maintaining the photocatalytic activity of the titanium dioxide (TiO$_2$), and wherein immediately below the photocatalytic antisoiling layer is an underlayer having a crystallographic structure for assisting in the crystallization, by heteroepitaxial growth, in the anatase form of the photocatalytic antisoiling layer, wherein the underlayer is made of BaTiO$_3$ and/or SrTiO$_3$.

2. The structure of claim 1, wherein said thin nonporous layer comprising silicon and oxygen is present in the form of a continuous film.

3. The structure of claim 1 wherein said thin layer comprising silicon and oxygen is present in the form of a film that conforms to the surface asperities of the underlying photocatalytic antisoiling layer.

4. The structure of claim 1 wherein the thin nonporous layer comprising silicon and oxygen is a layer of at least one silicon-oxygen compound selected from the group consisting of SiO$_2$, SiOC, SiON, SiO$_x$, wherein x<2, and SiOCH.

5. The structure of claim 1 wherein the thin nonporous layer comprising silicon and oxygen is a layer of at least one silicon-oxygen compound further comprising at least one compound selected from the group consisting of $Al_2O_3$ and $ZrO_2$.

6. The structure as claimed in claim 5, wherein the Al/Si, the Zr/Si, or the Al/Si and Zr/Si atomic ratio does not exceed 1.

7. The structure of claim 5 wherein the structure comprises $Al_2O_3$ and wherein the Al/Si ratio is from 0.03 to 0.5.

8. The structure of claim 5, wherein the structure comprises $ZrO_2$ and wherein the Zr/Si ratio is from 0.05 to 0.4.

9. The structure of claim 1 wherein the thin nonporous layer comprising silicon and oxygen has a thickness of at most 15 nm.

10. The structure as claimed in claim 1, wherein the photocatalytic antisoiling layer consists of $TiO_2$ alone or of $TiO_2$ doped with at least one dopant selected from the group consisting of N pentavalent cations of Nb, pentavalent cations of Ta pentavalent cations of V, Fe, and Zr.

11. The structure of claim 1, wherein the photocatalytic antisoiling layer has been deposited by
a sol-gel method,
or by a pyrolysis method
or by room-temperature vacuum sputtering,
using a metal or $TiO_x$ target, wherein x<2, and in an oxidizing atmosphere, or using a $TiO_2$ target in an inert atmosphere, the $TiO_2$ produced by the sputtering then optionally being subjected to a heat treatment so as to be in the crystallized state in a photocatalytically active form.

12. The structure of claim 11, wherein the $TiO_2$ is subjected to a heat treatment so as to be in the crystallized state in a photocatalytically active form.

13. The structure of claim 11, wherein the room-temperature vacuum sputtering comprises magnetron sputtering.

14. The structure of claim 11, wherein the room-temperature vacuum sputtering comprises ion-beam sputtering.

15. The structure of claim 11, wherein the room-temperature vacuum sputtering comprises magnetron sputtering and ion-beam sputtering.

16. The structure of claim 1, wherein the thin nonporous layer comprising silicon and oxygen has been deposited by room-temperature vacuum sputtering using a target of Al (8 at %)-doped Si, in an $Ar/O_2$ atmosphere, at a pressure of 0.2 Pa.

17. The structure of claim 1, wherein the substrate comprises a sheet,
whether plane or having curved faces, wherein the sheet comprises at least one material selected from the group consisting of monolithic glass, laminated glass, glass-ceramic, and a hard thermoplastic, or glass fibers, or glass-ceramic fibers,
wherein said sheet or said fibers have, optionally, received at least one other functional layer before application of photocatalytic antisoiling layer or have, optionally, received a layer for assisting in the crystallization of the photocatalytic antisoiling layer by heteroepitaxial growth.

18. The structure of claim 17, comprising the at least one other functional layer, wherein the at least one other functional layer is selected from the group consisting of at least one layer having an optical functionality, at least one thermal control layer and at least one conducting layer, and wherein, if the substrate comprises glass or glass-ceramic, the at least one functional layer acts as a barrier to the migration of alkali metals from the glass or from the glass-ceramic.

19. The structure of claim 17, wherein the sheet or the fibers have received at least one other functional layer before application of the photocatalytic antisoiling layer.

20. The structure of claim 17, comprising a layer for assisting in the crystallization of the photocatalytic antisoiling layer by heteroepitaxial growth.

21. A process for manufacturing the structure of claim 1, comprising
depositing an optionally doped $TiO_2$ layer on a substrate comprising glass, glass-ceramic, polycarbonate-type hard plastic, of the sheet type, glass fibers, or glass-ceramic fibers,
wherein said optionally doped $TiO_2$ layer is optionally subjected to a heat treatment in order to give it a photocatalytic property if the photocatalytic property is not provided by the conditions used for depositing the optionally doped $TiO_2$ layer, and
depositing a thin layer comprising silicon and oxygen on said photocatalytic layer, to form the structure of claim 1.

22. The process of claim 21, wherein the deposition of the $TiO_2$ layer and the thin layer comprising silicon and oxygen are carried out in succession at room temperature, by vacuum sputtering, in the same chamber, the conditions being the following:
for depositing the $TiO_2$ layer, supply in AC or DC mode, at a pressure of 1-3 mbar and in an oxygen/inert gas (argon) atmosphere, using a Ti or $TiO_x$, target, where x=1.5 to 2; and
for depositing the layer comprising silicon and oxygen, supply in AC mode at a pressure of 0.1 to 1.0 Pa and in an $Ar/O_2$ atmosphere using a target having a high silicon content,
the deposition of the $TiO_2$ layer being optionally preceded by the deposition of an underlayer for assisting in the crystallization by epitaxial growth in the anatase form of the $TiO_2$ layer.

23. The process of claim 22, comprising depositing an underlayer for assisting in the crystallization by epitaxial growth in the anatase form of the $TiO_2$ layer.

24. The process of claim 21, wherein the substrate is a glass or glass-ceramic substrate, wherein, before application of the $TiO_2$ layer, at least one layer forming a barrier to the migration of alkali metals present in the glass or glass-ceramic substrate is deposited on the substrate, and wherein, optionally, an annealing or toughening operation is carried out after the $TiO_2$ layer and the thin layer covering the $TiO_2$ layer have been deposited.

25. The process of claim 24, wherein, after the application of the at least one layer forming a barrier to the migration of alkali metals and before application of the $TiO_2$ layer, at least one functional layer selected from the group consisting of at least one layer having an optical functionality, at least one thermal control layer, and at least one conducting layer is deposited, wherein said at least one functional layer is advantageously deposited by vacuum sputtering.

26. The process of claim 24, comprising carrying out an annealing operation, wherein the annealing operation is carried out at a temperature of between 250° C. and 500° C.

27. The process of claim 24, comprising carrying out a toughening operation, wherein the toughening operation is carried out at a temperature of at least 600° C.

28. The process of claim 21, wherein the $TiO_2$ layer is doped.

29. A single or multiple glazing, comprising, on at least one face respectively, the structure as defined in claim 1.

* * * * *